US008782276B2

(12) United States Patent
Piepenbrink et al.

(10) Patent No.: US 8,782,276 B2
(45) Date of Patent: *Jul. 15, 2014

(54) METHOD AND SYSTEM FOR SELECTING A DELIVERY METHOD FOR MEDIA ON DEMAND

(71) Applicant: AT&T Intellectual Property I, L.P., Atlanta, GA (US)

(72) Inventors: David Piepenbrink, Chicago, IL (US); Lee M. Chow, Naperville, IL (US); James T. Sofos, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,831

(22) Filed: Oct. 29, 2012

(65) Prior Publication Data

US 2013/0073742 A1  Mar. 21, 2013

Related U.S. Application Data

(63) Continuation of application No. 12/642,079, filed on Dec. 18, 2009, now Pat. No. 8,341,284.

(51) Int. Cl.
*G06F 15/16* (2006.01)

(52) U.S. Cl.
USPC .............................. 709/234; 709/235; 725/46

(58) Field of Classification Search
CPC ... H04L 65/60; H04L 43/0811; H04L 1/1838; H04L 29/06469
USPC .......................................... 709/231, 234–235
See application file for complete search history.

(56) References Cited

U.S. PATENT DOCUMENTS

| 2002/0188955 | A1  | 12/2002 | Thompson et al. |
| 2003/0167337 | A1  | 9/2003  | Liew et al. |
| 2006/0259454 | A1  | 11/2006 | Greene et al. |
| 2007/0038773 | A1* | 2/2007  | White et al. ................... 709/233 |
| 2009/0147953 | A1* | 6/2009  | Gillon et al. .................. 380/210 |
| 2010/0235438 | A1* | 9/2010  | Narayanan et al. ........... 709/203 |
| 2011/0075671 | A1* | 3/2011  | Davidson et al. ........ 370/395.21 |
| 2011/0095875 | A1* | 4/2011  | Thyssen et al. ............ 340/407.1 |
| 2011/0153856 | A1  | 6/2011  | Piepenbrink et al. |

OTHER PUBLICATIONS

Non-Final Rejection for U.S. Appl. No. 12/642,079 received from the United States Patent and Trademark Office (USPTO) mailed Dec. 21, 2010, 26 pages.

(Continued)

*Primary Examiner* — Patrice Winder
*Assistant Examiner* — Eyob Hagos
(74) *Attorney, Agent, or Firm* — Toler Law Group, PC

(57) ABSTRACT

Computer-implemented methods, computer-readable media, and systems are disclosed. A computer implemented method includes receiving device a first connection speed of a data connection to a host including a media content delivery method based on the first connection speed and user preference information. The method requesting delivery of the media content from the host using the media content delivery method. The computer implemented method includes determining, during delivery of the media content to the receiving device, a second connection speed of the data connection. The method of delivery is determining, during delivery of the media content to the receiving device, whether to modify the media content delivery method based on the second connection speed and the user preference information.

19 Claims, 9 Drawing Sheets

(56) References Cited

OTHER PUBLICATIONS

Final Rejection for U.S. Appl. No. 12/642,079 received from the United States Patent and Trademark Office (USPTO) mailed May 10, 2011, 31 pages.

Non-Final Rejection for U.S. Appl. No. 12/642,079 received from the United States Patent and Trademark Office (USPTO) mailed Oct. 19, 2011, 33 pages.

Notice of Allowance for U.S. Appl. No. 12/642,079 received from the United States Patent and Trademark Office (USPTO) mailed Aug. 16, 2012, 16 pages.

Response to Amendment Under Rule 312 for U.S. Appl. No. 12/642,079 received from the United States Patent and Trademark Office (USPTO) mailed Nov. 23, 2012, 3 pages.

* cited by examiner

METHOD AND SYSTEM FOR SELECTING A DELIVERY METHOD FOR MEDIA ON DEMAND

CLAIM OF PRIORITY

The present application claims priority from and is a continuation of patent application Ser. No. 12/642,079 filed on Dec. 18, 2009, the contents of which are expressly incorporated herein by reference in their entirety.

FIELD OF THE DISCLOSURE

The present disclosure is generally related to selecting a delivery method for media on demand.

BACKGROUND

On-demand delivery of audiovisual content or other media content over broadband services may involve delivery of very large media files over broadband connections of varying speed and stability. Because available bandwidth may vary with network usage, location of the receiving device relative to a host or a server, and other factors, a delivery method that may be appropriate for one user at one location and at one particular time may not be satisfactory for another user at a different location or at a different time.

For example, while a first user at a first location may be able to stream motion video media content at high resolution at any time of day or night without playback stoppages, a second user at a second location may be able to satisfactorily stream motion video content only during low usage hours. During higher usage hours, the second user may instead download media content to avoid frequent playback stoppages. Progressive downloading, in which metadata about the media file is stored in the first part of the file to be transmitted, allows playback to begin before all of the media content is fully downloaded. Like streaming, however, progressive downloading permits the start of playback usually only after a certain portion of the media content has already been received in hopes of avoiding playback stoppages.

An additional problem arises when, during the delivery of the media file via streaming or downloading, the condition of the communication connection changes. For example, at a location where streaming was available at one time, increasing network usage or other changes affecting the communication connection may prevent satisfactory streaming. Conversely, it is possible that at a second location and at a second time, satisfactory streaming may not have been available but may become available.

DETAILED DESCRIPTION

Figure 1:
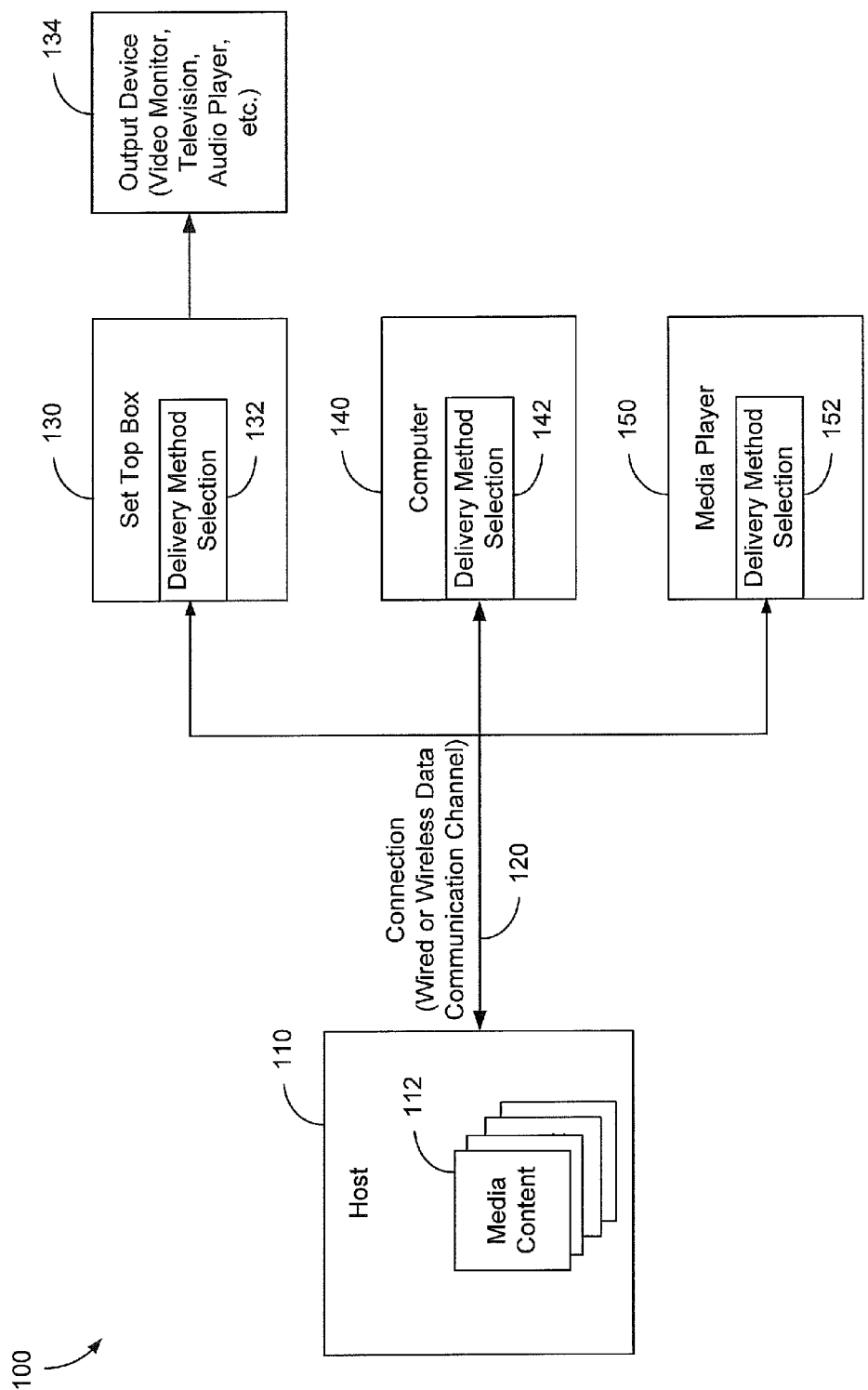
FIG. 1 depicts a block diagram of a system in which different types of receiving devices may receive media content from a host over a connection.

Using computer-implemented methods, computer-readable media storing instructions executable by a computer system, and systems disclosed herein, an appropriate delivery method for media content for a particular receiving device may be determined. The receiving device, such as a computer, set-top box, or media player, checks the connection speed with the host that provides the media content. Depending on the connection speed, streaming or downloading is specified as the delivery method for the media content, and delivery of the media content begins. During delivery of the media content, the connection speed is reassessed. When streaming is specified as the delivery method, and when the connection speed is determined to be insufficient for streaming at a current bitrate, the bitrate is adjusted. If the connection speed becomes insufficient to continue to support streaming, the delivery method of the media content may be changed to progressive download. When progressive download is specified as the delivery method, an assessment is made as to whether a buffer fill size (the buffer fill size determines what portion of the media content is received before playback begins) is appropriate for the connection speed. When the buffer fill size is reached, playback begins. The buffer fill size may be changed to permit playback to begin more quickly or to avoid playback stoppages based on the connection speed, based on user preferences, or based on a combination of connection speed and user preferences.

In a particular embodiment, a computer-implemented method includes determining, from a receiving device, a connection speed between the receiving device and a host. The computer implemented method selects a method of delivery for specified media content based on the connection speed. The method of delivery is selected as streaming when the connection speed satisfies a speed threshold. The method of delivery is selected as downloading when the connection speed does not satisfy the speed threshold. The computer implemented method requests delivery of the specified media content from the host using the selected method of delivery.

In another particular embodiment, a computer-readable storage medium stores instructions executable by a computer system to determine, from a receiving device, a connection speed of a data communication channel between the receiving device and a host. The computer-readable storage medium includes instructions, based on the connection speed, to select streaming of progressive downloading as a delivery method. The computer-readable storage medium includes instructions, based on the connection speed, to determine a buffer fill size appropriate to the connection speed for the delivery method. The computer-readable medium storage also includes instructions to change the buffer fill size in response to changes in the connection speed. The computer-readable storage medium also includes instructions to initiate playback of the media content when the buffer fill size is reached.

In still another particular embodiment, a system includes a communications interface configured to interface with a connection to a host that is configured to serve media content. The system includes a memory configured to receive the media content from the host. The system also includes a processor coupled to the communications interface and to the memory. The processor is configured to receive a selection of specified media content to be received from the host. The processor is also configured to determine a connection speed available with the connection. The processor is further configured to select a method of delivery for the specified media content based on the connection speed. The selected method of delivery includes streaming when the connection speed satisfies a speed threshold, and the selected method includes downloading when the connection speed does not satisfy the speed threshold. The processor is also configured to request delivery of the specified media content from the host using the selected method of delivery.

FIG. 1 depicts a block diagram of a system 100 in which different types of receiving devices 130, 140, and 150 may receive media content 112 from a host 110 over a connection 120, such as a wired or wireless data communications channel. The host 110 may include a server or one of a plurality of distributed servers that provide access to the media content 112. The receiving devices may include a set-top box 130, a computer 140, a media player 150, or other devices configured to access the connection 120 and to present the media content to the user. Some receiving devices, such as the set-top box 130, may be coupled to a separate output device, such as a video monitor, a television, an audio player, or another type of output device 134, through which a user receives input to interact with the set-top box 130. For example, to solicit user input, the set-top box 130 may generate images and sounds that are presented via the output device 134 so that the user may make selections of media content 112 or other options. The set-top box 130 receives the user input and, based on the user input, communicates via the connection 120 with the host 110 and receives the media content 112 via the connection 120 from the host 110. The set-top box 130 presents the media content 112 to the user via the output device 134. By contrast, other receiving devices, such as the computer 140 or the media player 150 may be integrated devices that include an interface to communicate with the host 110 and audio or audiovisual input/output devices through which user input is solicited and through which the media content 112 is presented to the user.

According to a particular illustrative embodiment, the receiving devices 130, 140, and 150 each include a delivery method selection system 132, 142, and 152, respectively. The delivery method selection systems 132, 142, and 152 determine the connection speed of the connection 120 as it is presented at each of the receiving devices 130, 140, and 150, respectively. For example, the delivery method selection systems 132, 142, and 152 may determine the connection speed by counting a number of packets of data received during a specified time interval. A connection speed may be determined as a ratio of the packets to the specified time interval. However, if the specified time interval is kept constant, the number of packets received may be used as a relative measure of the connection speed during each of the specified time intervals during which the connection speed is determined. Based on the communication speed, the delivery method selection systems 132, 142, and 152 determine what delivery method is most appropriate for the respective receiving devices 130, 140, and 150, such as delivery by streaming or by progressive downloading. When streaming or progressive downloading begins, the delivery selection systems 132, 142, and 152 continue to monitor the connection speed of the connection 120 to determine if the delivery method should be changed or to determine if download parameters should be changed to accommodate changes in the connection speed.

For example, when the media content 112 is originally selected for delivery by streaming and when the connection speed of the connection 120 changes during transmission of the media content (e.g., the connection speed drops appreciably), the respective delivery method selection system 132, 142, or 152 may switch the delivery method to progressive downloading. As a further example, when progressive downloading is the method of delivery and the connection speed of the connection 120 increases, a buffer fill size parameter may be changed. The buffer fill size specifies a quantity of data to be received before beginning or restarting playback. When the connection speed increases, it may be concluded that as the connection speed increases as received data is played back, the next portion of data may be replenished more quickly than the received data would have been replenished at a lower connection speed. Thus, it may be desirable to reduce the buffer fill size to shorten a delay in starting or restarting playback. By contrast, if it is determined that the connection speed has decreased, it may be desirable to increase the buffer fill size. Increasing the buffer fill size may delay starting or restarting of playback, but specifying that a larger quantity of data is to be received before starting playback may avoid playback stoppages that could occur if the received data is played back before additional data is received.

Figure 2:
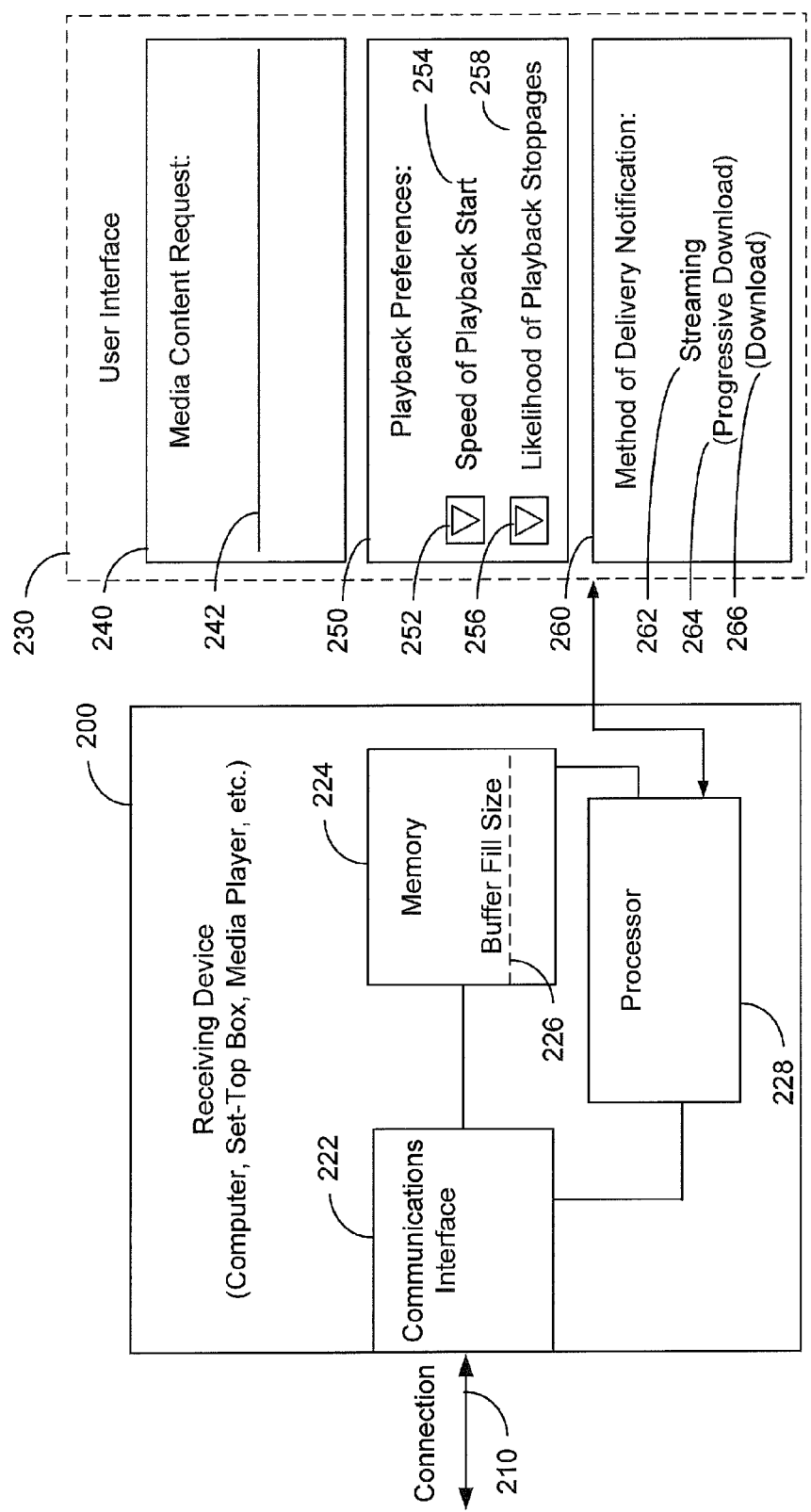
FIG. 2 depicts a block diagram of a particular embodiment of a receiving device to receive media content and to present a user interface to receive user input related to selecting a delivery method for the media content.

FIG. 2 depicts a block diagram of a particular embodiment of a receiving device 200 to receive media content and to present a user interface 230 to receive user input related to selecting a delivery method for the media content. The receiving device 200 may include a standalone device, such as the computer 140 or the media player 150 of FIG. 1, or the receiving device 200 may include a device, such as the set-top box 130 that provides output to the user through a separate output device 134 to enable presentation of the user interface 230. The receiving device 200 is coupled to a connection 210 through which media content is received.

The receiving device 200 includes a communications interface 222, a memory 224, and a processor 228, each of which are interconnected. By contrast with FIG. 1, instead of the delivery method selection system 132, 142, and 152 associated with the receiving devices 130, 140, and 150, respectively, being a dedicated device that is part of or is external to the receiving devices 130, 140, and 150, a delivery method selection system may be implemented as computer-implemented methods or via computer-executable instructions stored in a computer-readable medium within the memory 224 of the receiving device 200. The computer-implemented methods or computer-executable instructions may be executed by the processor 228 in communication with the memory 224 and the communications interface 222. The processor 228, in communication with the memory 224 and the communications interface 222, may generate the user interface 230 and solicit user input via the user interface 230 that may be used in selecting the delivery method for media content.

According to a particular illustrative embodiment, the receiving device 200 is coupled to the connection 210 via the communications interface 222. The communications interface 222 receives the media content from the connection 210 and transmits user selections and user input related to the delivery method over the connection 210. The communications interface 222 also tests the connection speed of the connection. In a particular illustrative embodiment, the communications interface 222 continually (e.g., periodically at a sampling interval) tests or samples the connection 210 to test the connection speed at intervals, regardless of whether the receiving device 200 requested media content or not. In another particular illustrative embodiment, the communications interface 222 begins to test or sample the connection speed of the connection 210 when the receiving device 200 requests delivery of media content. In either embodiment, when delivery of the media content begins, the communications interface 222 continues to sample or test the connection speed of the connection 210 to determine if the connection 210 supports the selected delivery method or if a change in the buffer fill size may be appropriate.

The memory 224 is coupled to the communications interface 222 to store the media content received via the communications interface 222. Regardless of the selected delivery method, before the media content is played back, some quantity of the media content is buffered in the memory 224. The quantity of the media content to be buffered before playback is started or restarted is determined by a buffer fill size 226. According to a particular illustrative embodiment, the buffer fill size 226 is set based on the connection speed of the connection 210 and based on the selected delivery method. According to another particular illustrative embodiment, based on monitoring of connection speed changes the buffer fill size 226 may change during delivery and playback of the media content.

The processor 228, which is coupled to both the communications interface 222 and the memory 224, receives data regarding the connection speed and the quantity of media content buffered in the memory 224. The processor 228 determines when a quantity of the media content stored in the memory 224 has reached the buffer fill size 226 to enable playback. When the buffered quantity of the media content reaches the buffer fill size 226, the processor 228 initiates playback of the media content. The processor 228 also monitors the connection speed to set the buffer fill size 226 of the memory 224. The processor 228 may monitor connection speed information at intervals regardless of whether media content has been requested or the processor 228 may monitor connection speed information when media content has been requested. The processor 228 continues to monitor connection speed information after delivery of the media content has commenced to determine if the buffer fill size 226 should be changed or if a requested bitrate should be changed.

For example, the buffer fill size may be increased or decreased in response to connection speed changes. The buffer fill size may be decreased when the connection speed increases to reduce delays in starting and restarting playback. The buffer fill size may be increased when the connection speed decreases to reduce playback stoppages resulting from delays in data transmission. For example, when streaming is the selected delivery method, the bitrate supported by the connection speed determines the resolution of the streaming media. When the connection speed increases, a higher bitrate may be requested, thus providing higher resolution media content. When the connection speed decreases, a lower bitrate may be requested, enabling streaming playback to continue while lowering the resolution of the media content.

The processor 228 also is configured to present the user interface 230 to obtain user input regarding media content and user preferences that may determine the delivery method of the media content. The user interface 230 may include a media content request interface 240. The media content request interface 240 solicits user input 242, in menu form, text form, etc., of media content the user wishes to receive via the receiving device 200. The type of media content requested, whether such content is audio content, audiovisual content, high definition (HD) audiovisual content, etc., may indicate a bandwidth involved in receiving the requested media and, thus, may pertain to which delivery method is selected for the media content. The user interface also may include a playback preferences interface 250. The playback preferences interface 250 may provide a speed input 252 and may provide a playback start prompt 254 to elicit from the user a preference as to whether the user prefers a rapid playback start or is willing to wait for playback to start. The playback preferences interface 250 may provide a playback stoppages input 256 and may provide a playback stoppages prompt 258 to elicit from the user a preference as to whether the user is willing to tolerate stoppages when playback starts.

For example, if the user indicates via the speed input 252 that the user prefers playback to start right away, the user's input would mitigate toward streaming as the delivery method, when possible. On the other hand, if the user indicates via the playback stoppages input 256 that the user is averse to playback stoppages, the user's input would mitigate toward progressive download as the delivery method. The user preferences may conflict, for example, when the user wishes rapid playback start but is averse to playback stoppages, or the user preferences may be harmonious, for example, when the user is willing to wait for playback start but is averse to playback stoppages, wherein both inputs would mitigate toward progressive download as the delivery method. These preferences may affect the selection of the delivery method. The playback preferences interface 250 may be presented each time that media is requested, when the receiving device 200 is first installed, or presented at another time (e.g., at scheduled intervals). The user interface 230 also may include a method of delivery notification 260 to signal the selected method of delivery to the user. The selected method of delivery, for example, may include streaming 262, progressive downloading 264, or regular downloading 266.

The processor 228, based on connection speed information received from the communications interface 222, information about the media content buffered from the memory 224, and user preferences elicited via the user interface 230, determines the selected delivery method. When the processor 228 determines the appropriate delivery method, the receiving device 200 communicates the selected delivery method for the media content (e.g. to the host 110 via the connection 210).

Figure 3A:
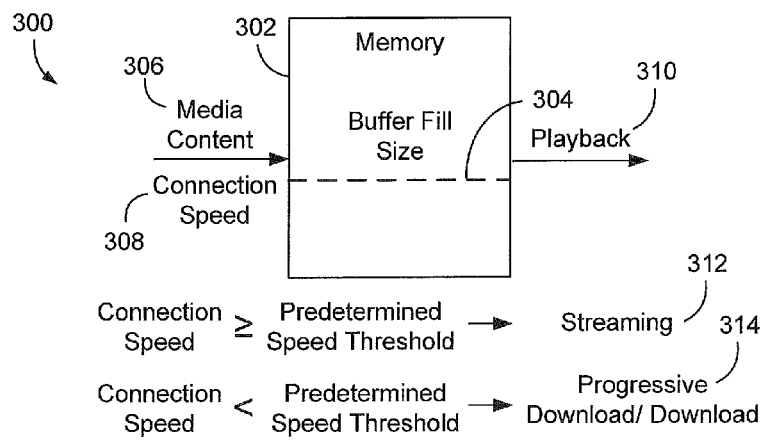
FIGS. 3A-3D depict a memory of the receiving device of FIG. 2 and illustrate that playback of received media content starts depending upon a quantity of the media content received.

FIGS. 3A-3D depict different conditions 300, 320, 340, and 360 of a memory 302, 322, 342, and 362, such as the memory 224 of the receiving device of FIG. 2. Referring to FIG. 3A, the memory 302 receives media content 306 at a known connection speed 308 and the media content 306 is buffered in the memory 302. Generally, when the media content 306 buffered in the memory 302 reaches the buffer fill size 304, playback 310 commences.

The delivery method generally is selected between streaming and progressive download, although regular downloading (in which the entire media content is received before playback begins) may be used. In one particular embodiment, a specified speed threshold for the connection speed of the connection 210 (FIG. 2) is used to select the delivery method. Thus, when the connection speed satisfies (e.g., is equal to or greater than) the speed threshold, streaming 312 is the selected delivery method, as shown at 312. On the other hand, when the connection speed does not satisfy (e.g., is less than) the speed threshold, progressive download (or regular download) is the selected delivery method, as shown at 314. However, as previously described with regard to FIG. 2, user inputs as to acceptance of or aversion to waiting for playback to start or playback stoppages may affect this determination. In one particular embodiment, the user inputs affect the buffer fill size 304. The buffer fill size 304 may affect the determination of the speed threshold that delineates between media content to be received via streaming and media content to be received via progressive download.

Figure 3B:
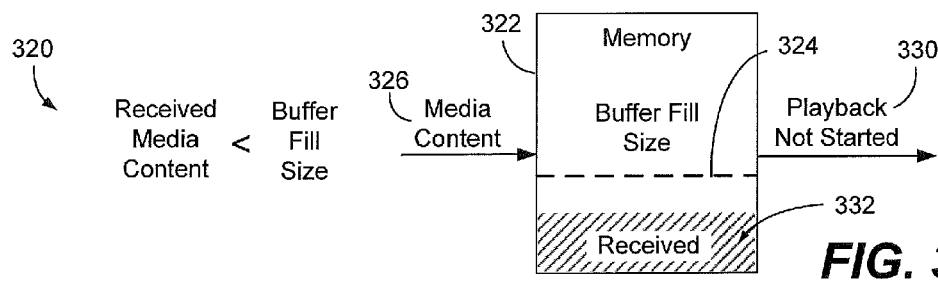
Figure 3C:
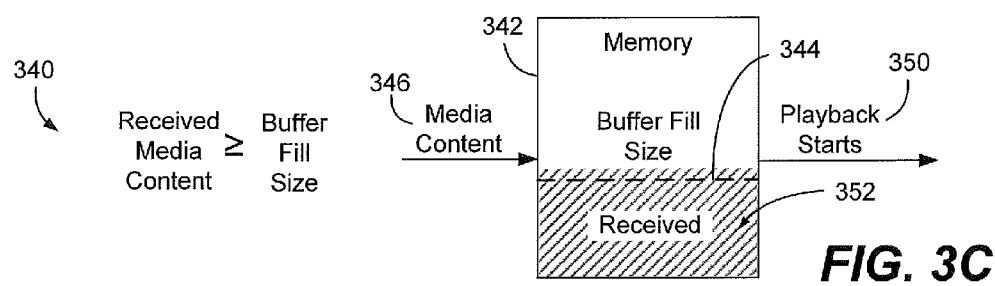
Figure 3D:
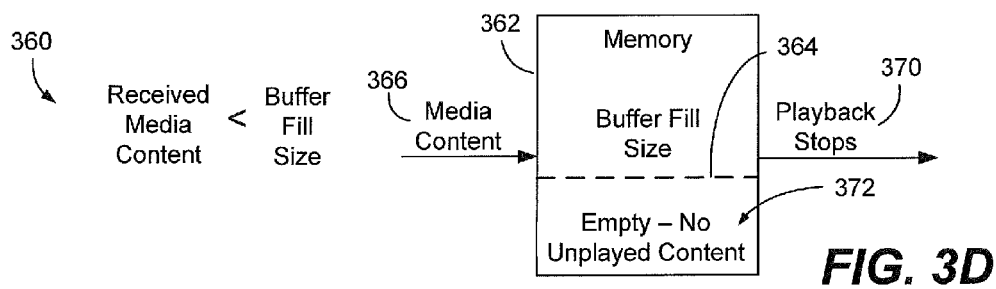

Referring to FIGS. 3B-3C, a quantity of media content received and buffered in the memory 322, 342, and 362 determines when to start or stop playback of the media content 326, 346, and 366, respectively. For example, FIG. 3B illustrates a case where the media content 326 is buffered in the memory 322, but where the received portion 332 has not reached the buffer fill size 324. When the received media content 332 has not yet reached the buffer fill size 324, playback is not started, as shown at 330. On the other hand, FIG. 3C illustrates a case where the media content 346 is buffered in the memory 342 and where the received portion 352 has reached the buffer fill size 344. Because the received media content 352 has reached the buffer fill size 344, playback starts, as shown at 350. FIG. 3D illustrates a case where the media content 366 is buffered in the memory 362 and where the received portion 372 is empty in the sense that there is no more unplayed received content in the memory 362. When the memory 362 is empty 372, playback stops, as shown at 370.

FIGS. 3B-3D show that a level at which the buffer fill size 324, 344, and 364 is set affects playback. For example, the higher is the buffer fill size 324, 344, and 364, the greater will be the quantity of received media content 332, 352, and 372, respectively, to be received before media playback starts. As a result the higher the buffer fill size 324, 344, and 364 is the longer will be the delay before media playback commences. However, if the buffer fill size 324, 344, and 364 is higher, than there is a greater buffer of received media content to play while awaiting an influx of additional media content 326, 346, and 366, respectively, that may prevent playback stoppages.

Figure 4A:
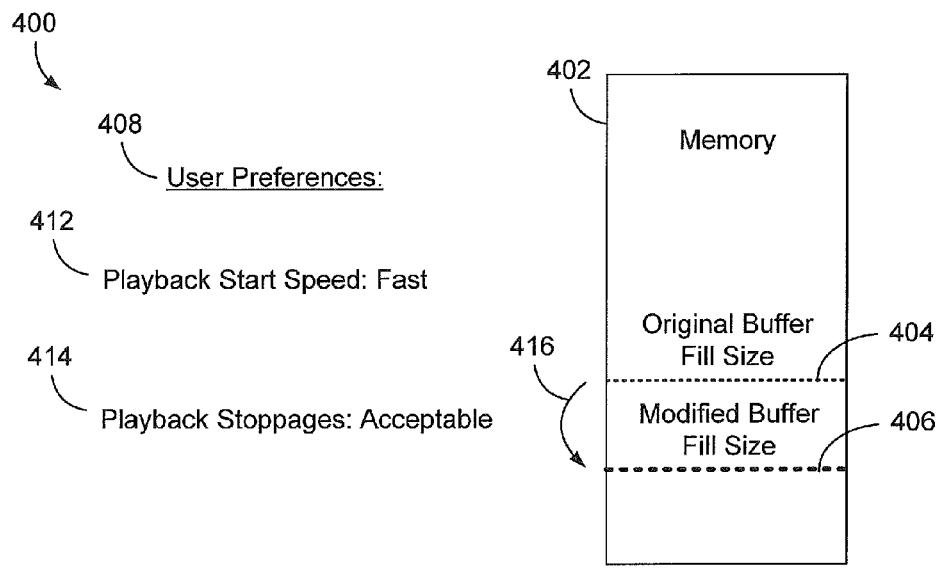
FIGS. 4A-4B depict a memory of the receiving device of FIG. 2 and illustrate the buffer fill size being changed based on user inputs to the user interface.
Figure 4B:
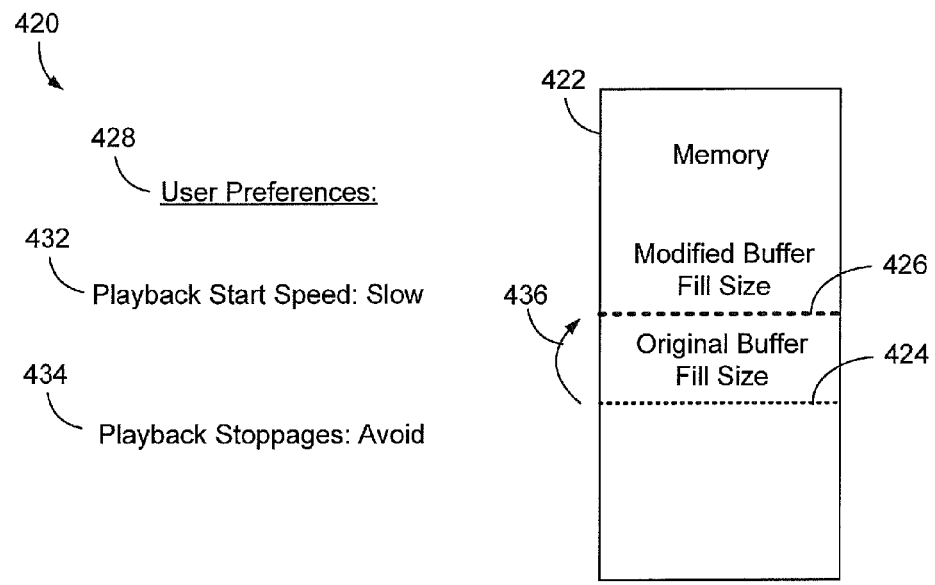

FIGS. 4A-4B depict a memory 402 and 422 of the receiving device of FIG. 2 wherein the buffer fill size 404 and 424 is changed based on user inputs. As described with reference to FIGS. 3B-3D, the buffer fill size 404 and 424 affects aspects of playback, such as delay before playback and the likelihood of playback stoppages. Thus, user preferences 408 and 428 elicited via the user interface 230 (FIG. 2) may affect the buffer fill size 404 and 424 and, thus, control aspects of when playback starts and stops.

FIG. 4A shows the memory 402 of a system in which the user preferences 408 include a playback start speed 412 and acceptance of playback stoppages are acceptable 414. The user preferences 408 indicate that a lower buffer fill size 404 is appropriate because, while the user indicates that the user does not mind playback stoppages, at 414, the user has indicated that the user does not want to wait long for playback to start, at 412. Both user preferences 408 mitigate toward reducing 416 the original buffer fill size 404 to a lower, modified buffer fill size 406.

FIG. 4B shows the memory 422 of a system in which the user preferences 428 include acceptance of a slow playback start speed 432 and a preference against playback stoppages 434. The user preferences 408 indicate that a higher buffer fill size is appropriate because, while the user indicates that the user does not mind waiting for playback to start, at 432, the user has indicated that the user does not want to experience playback stoppages, at 434. Both user preferences 428 mitigate toward increasing 436 the original buffer fill size 424 to a larger, modified buffer fill size 426. Thus, as shown in FIGS. 4A and 4B, buffer fill size may be changed from an original buffer fill size 404 and 424 (that may be set, for example, solely based on connection speed) to a modified buffer fill size 406 and 426, respectively, based on user preferences 408 and 428 relating to playback conditions.

Figure 5A:
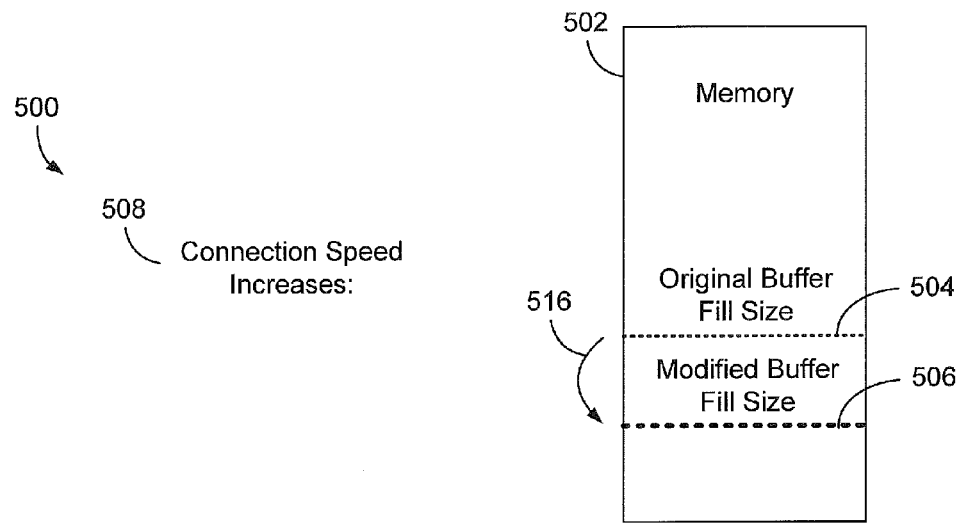
FIGS. 5A-5B depict a memory of the receiving device of FIG. 2 and illustrate the buffer fill size being changed based on changes in connection speed between the receiving device and the host.
Figure 5B:
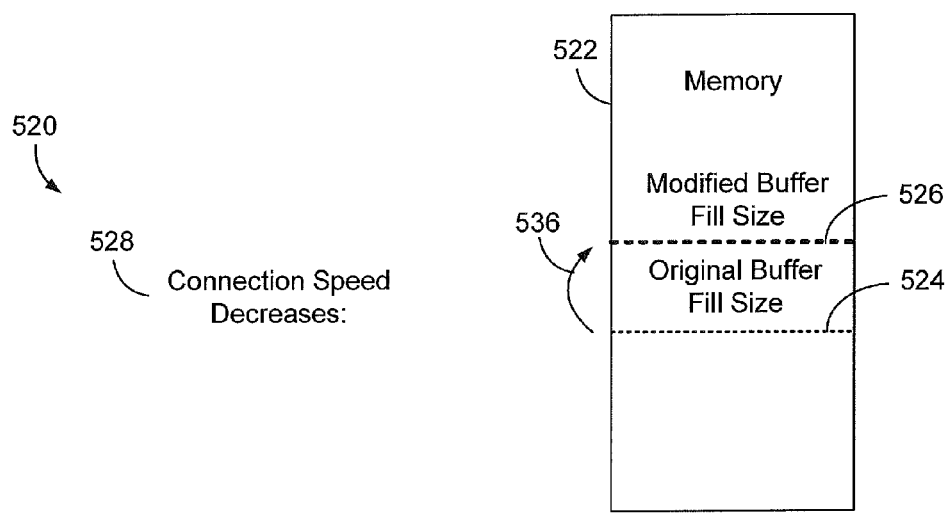

FIGS. 5A-5B depict a memory of the receiving device of FIG. 2 wherein the buffer fill size 504 and 524 is changed based on changes in connection speed between the receiving device and the host. Thus, for example, although the initial connection speed may indicate the buffer fill size 504 and 524 to be set to an original level, and the buffer fill size 504 and 524 may be modified according to user preferences, as described with reference to FIGS. 4A and 4B, the buffer fill size 504 and 524 may change again as a result of changes in connection speed.

FIG. 5A shows the memory 502 of a system experiencing an increased connection speed 508 during playback. An increase in connection speed results in the memory 502 being filled at a faster rate. With the increased connection speed 508, for example, if the user skips to a portion of the media content that is not stored in the memory 502, it may be desirable to restart playback without waiting to buffer a large quantity of the media content. Thus, the increased connection speed 508 mitigates toward reducing 516 the original buffer fill size 504 to a lower, modified buffer fill size 506.

FIG. 5B, by contrast, shows the memory 522 of a system experiencing a decreased connection speed 528 during playback. The decreased connection speed 528 results in the memory 522 being depleted at a faster rate and not being replenished as quickly. Thus, to avoid frequent playback stoppages, it may be desirable to delay restarting playback after a stoppage until a larger quantity of the media content may be buffered. Thus, the decreased connection speed 528 mitigates toward increasing 536 the original buffer fill size 524 to a higher, modified buffer fill size 526.

Figure 6:
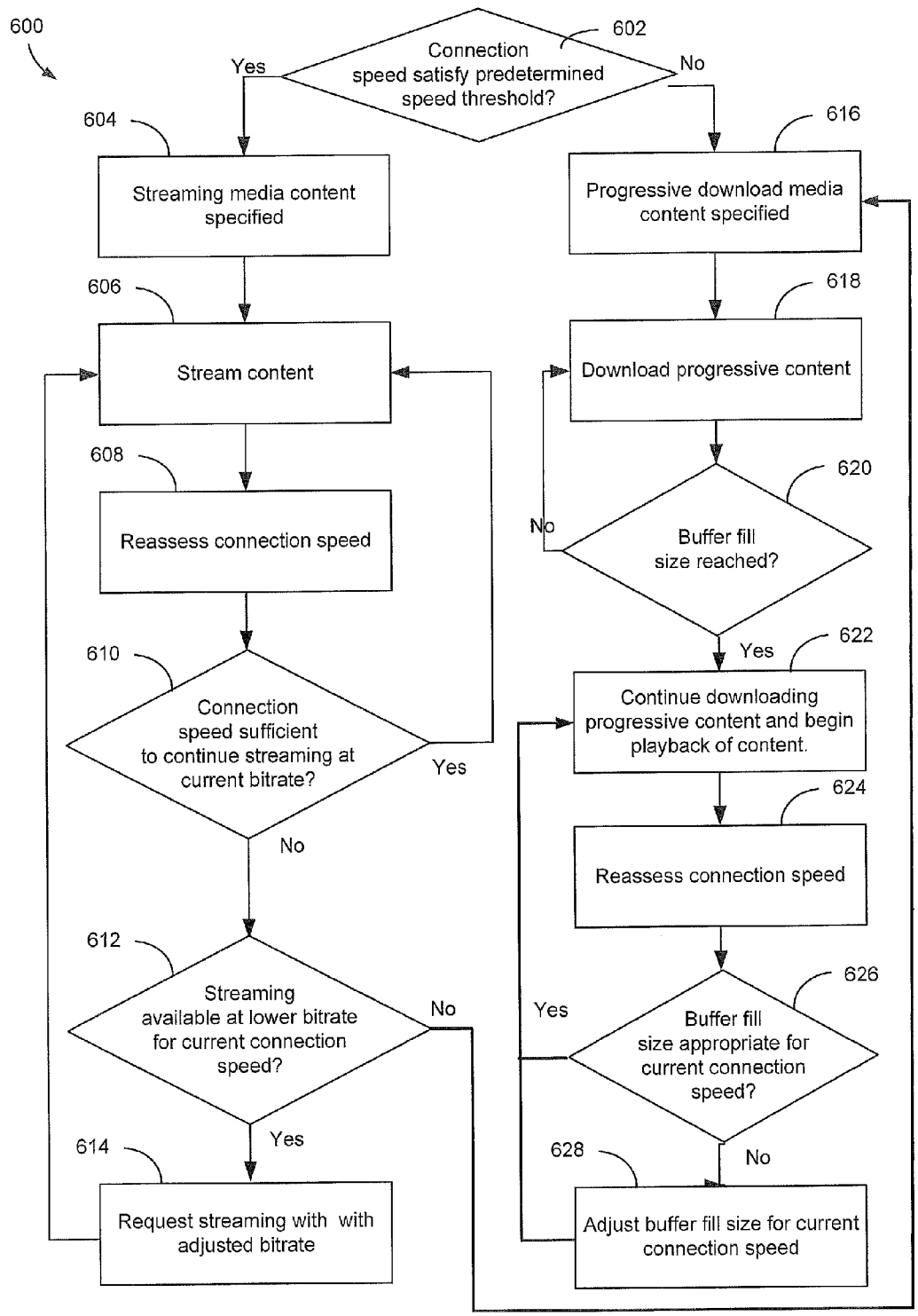
FIG. 6 is a flow diagram of a particular embodiment of a method to select a delivery method for media content.

FIG. 6 is a flow diagram of a first particular embodiment of a method 600 to select a delivery method for media content. It is determined if a connection speed satisfies a speed threshold to deliver media content by streaming, at 602. If not, progressive downloading is specified as the delivery method, at 616. On the other hand, when the connection speed is determined to satisfy the speed threshold, at 602, streaming is specified as the delivery method, at 604. The determination, at 602, may be made at the receiving device 200 by the communications interface 222 (FIG. 2), alone or together with the processor 228. Whether streaming is specified at the delivery method, at 604, or progressive downloading is specified as the delivery method, at 616, the communications interface 222 of the receiving device 200 communicates the selected delivery method via the connection 210 to the host 110 (FIG. 1).

When it is determined, at 602, that the connection speed satisfies the speed threshold for streaming, streaming of the content commences, at 606. The connection speed is reassessed, at 608. The communications interface 222 alone or in conjunction with the processor 228 may reassess the connection speed. It is determined whether the connection speed remains sufficient to continue streaming at a current bitrate, at 610. The communications interface 222 alone or in conjunction with the processor 228 may make the determination. If it is determined that the connection speed remains sufficient to continue streaming at a current bitrate, at 610, the method 600 returns to 606 to continue streaming the media content. On the other hand, if it is determined, at 610, that the connection speed cannot continue to support streaming at the current bitrate, it is determined whether streaming may be available at an adjusted bitrate for the current connection speed, at 612. Again, the communications interface 222 alone or with the processor 228 may determined whether streaming is available at the adjusted bitrate for the current connection speed. If it is determined that streaming at the adjusted bitrate may be available at the current connection speed, at 612, streaming with an adjusted bitrate is requested, at 614. The method 600 then returns to 606 to continue streaming the media content. On the other hand, if it is determined that streaming is not available at a lower bitrate for the current connection speed, at 612, streaming is discontinued and progressive downloading is specified as the delivery method, at 616.

When progressive downloading is specified as the selected delivery method, at 616, progressive downloading of the media content commences, at 618. It is determined whether the buffer fill size has been reached, at 620. The determination may be made by the processor 228 in conjunction with the memory 224 to determine if the buffer fill line 226 has been reached. If it is determined that the buffer fill line has not been reached, at 620, the method returns to 618 to continue downloading the progressive content. On the other hand, if it is determined that the buffer fill size has been reached, at 620, downloading of the progressive content continues and playback begins, at 622.

The connection speed is reassessed, at 624. The communications interface 222 alone or in conjunction with the processor 228 may reassess the connection speed. It is determined whether the buffer fill size is appropriate for the current connection speed, at 626. The communications interface 222 alone or in conjunction with the processor 228 may make the determination. If it is determined that the buffer fill size is appropriate for the connection speed, at 626, downloading and playback continue, at 622. On the other hand, if it is determined that the buffer fill size is not appropriate for the connection speed, at 626, the buffer fill size is adjusted for the current connection speed, at 628. The processor 228 may determine an adjustment of the buffer fill rate. When the buffer fill size is adjusted, at 628, downloading and playback continue, at 622.

Figure 7:
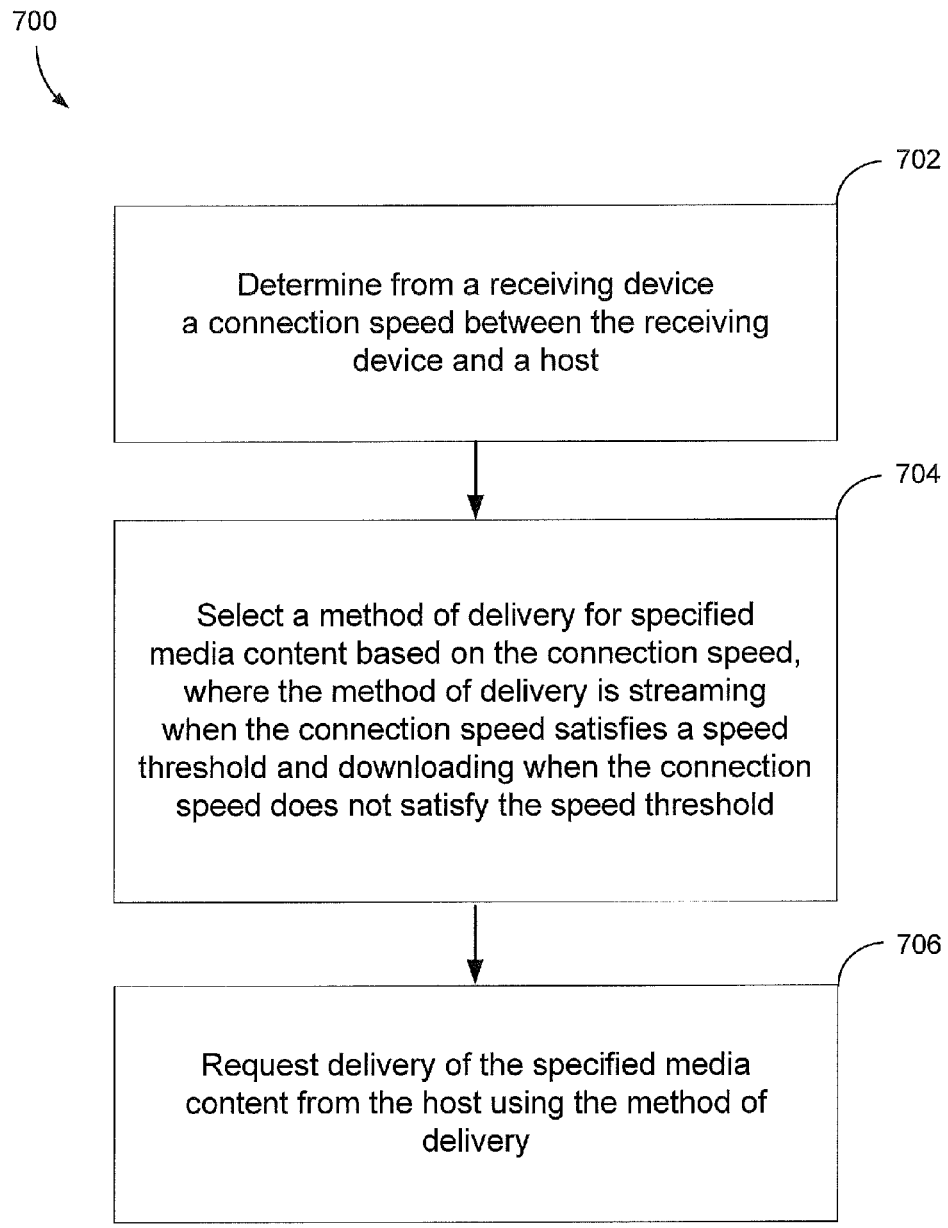
FIG. 7 is a flow diagram of a particular embodiment of a computer-implemented method to select a delivery method of requested media content.

FIG. 7 is a flow diagram of a second particular embodiment of a computer-implemented method 700 to select a delivery method of requested media content. From a receiving device, the connection speed between the receiving device and a host, at 702. The receiving device 200 (FIG. 2) may make the determination using the communications interface 222 alone or with the processor 228. A method of delivery for specified media content is selected based on the connection speed, at 704. The method of delivery may be determined to be streaming when the connection speed satisfies a speed threshold. The method of delivery may be determined to be downloading, such as progressive downloading, when the connection speed does not satisfy the speed threshold. The selection may be made by the processor 228. Delivery of the specified media content is requested using the method of delivery, at 706. For example, the processor 228 may issue a request for delivery via the communications interface 222 over the connection 210.

Figure 8:
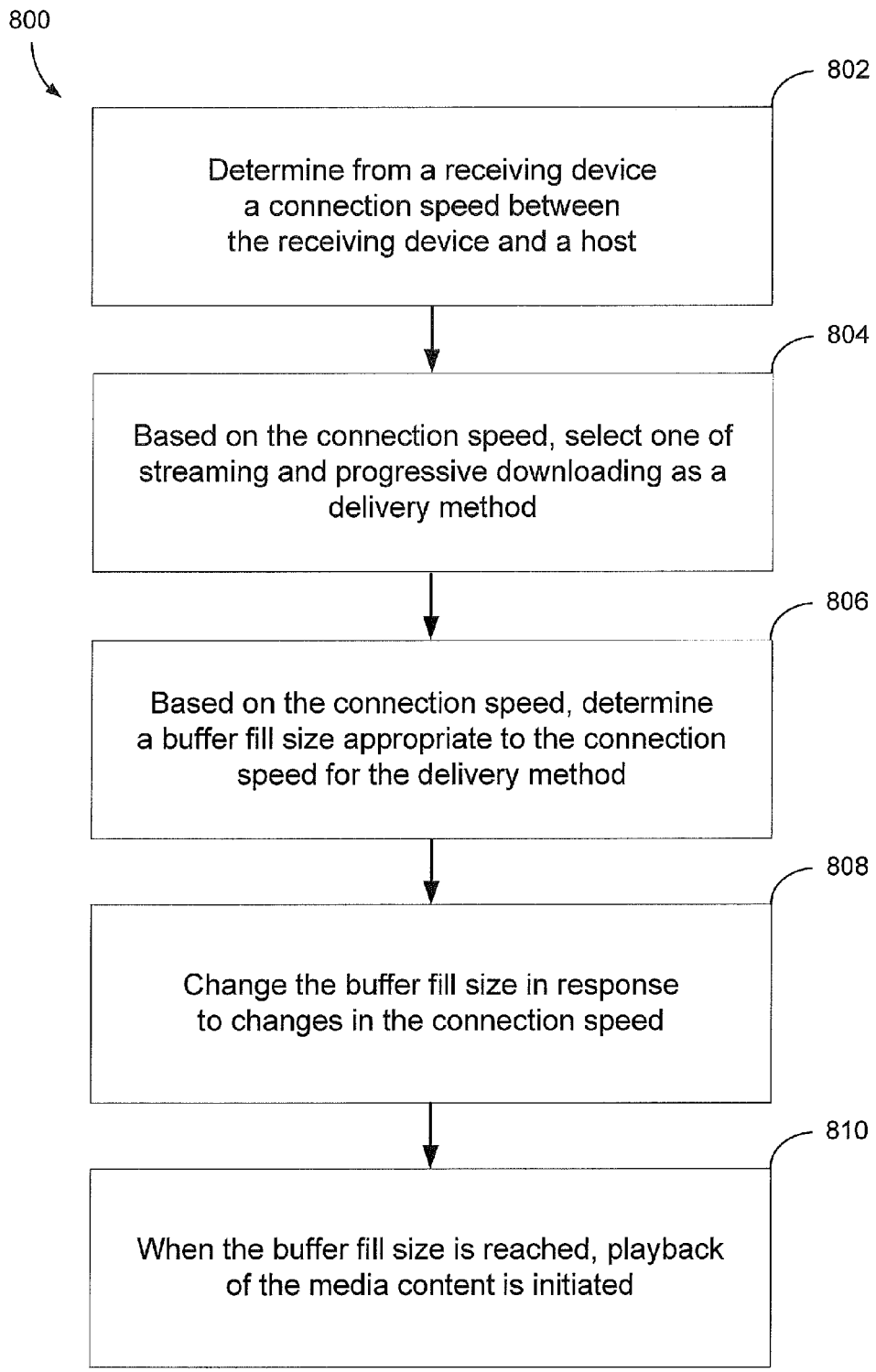
FIG. 8 is a flow diagram of a particular embodiment of a method implemented by computer-executable instructions to select a delivery method of requested media content.

FIG. 8 is a flow diagram 800 of a particular embodiment of a method implemented in computer-executable instructions to select a delivery method of requested media content. From a receiving device, the connection speed between the receiving device and a host is determined, at 802. The receiving device 200 (FIG. 2) may make the determination using the communications interface 222 alone or with the processor 228. Based on the connection speed, streaming or progressive downloading is selected as a delivery method, at 804. The selection of the delivery method may be made by the processor 228. Based on the connection speed, a buffer fill size appropriate for the selected delivery method is determined, at 806. The determination of the buffer fill size also may be made by the processor 228. The buffer fill size is changed in response to changes in the connection speed, at 808. The processor 228 may change the buffer fill size 226. When the buffer fill size is reached, playback of the media content may be initiated, at 810. The processor 228 may determine when the buffer fill size is reached and initiate playback.

Figure 9:
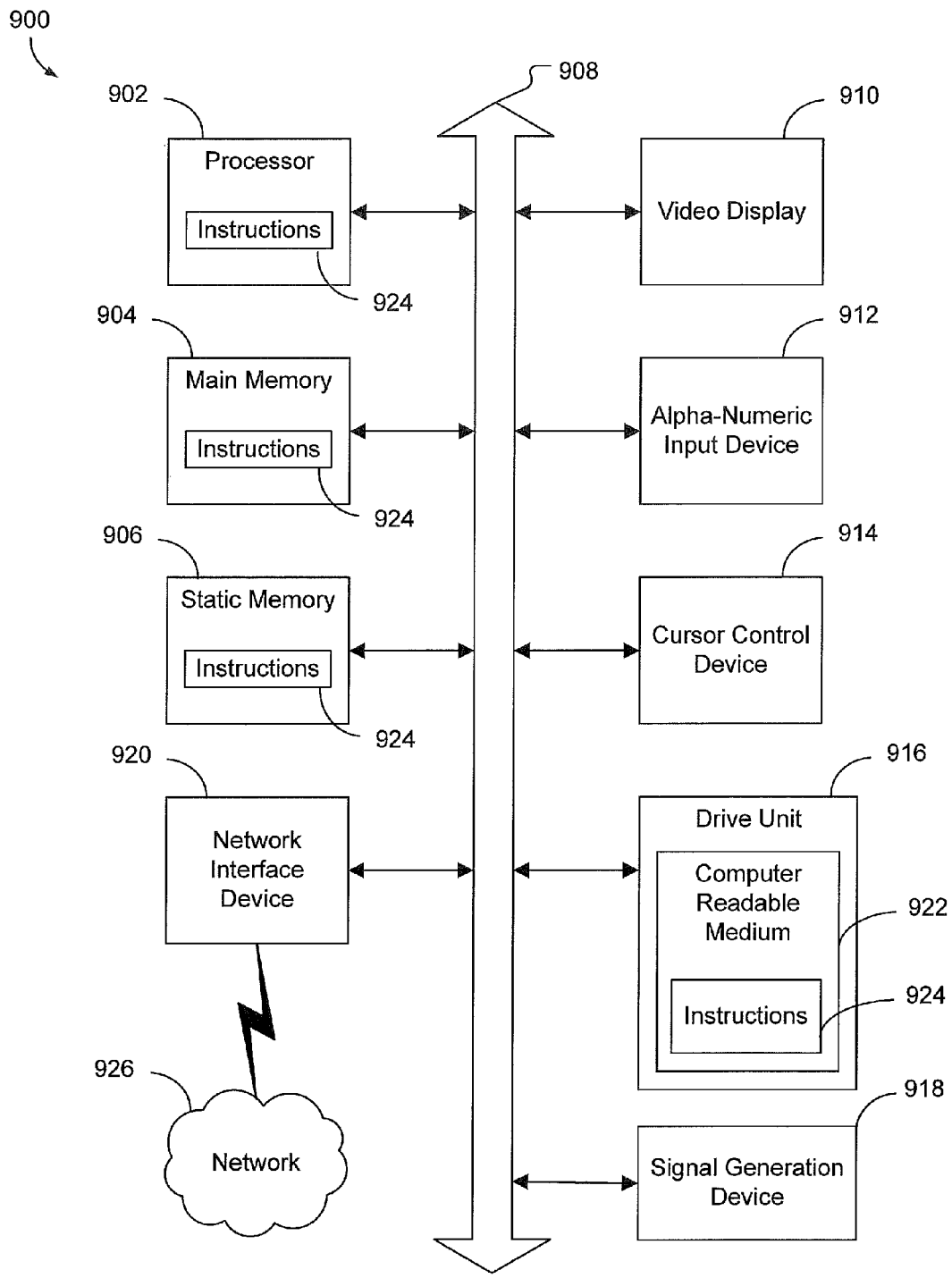
FIG. 9 is a block diagram of an illustrative embodiment of a general computer system.

FIG. 9 is a block diagram of an illustrative embodiment of a general computer system. Instructions may be executed by the computer system 900 to cause the computer system 900 to perform any one or more of the methods or computer based functions disclosed herein. The computer system 900, or any portion thereof, may operate as a standalone device or may be connected, e.g., using a network, to other computer systems or peripheral devices.

In a networked deployment, the computer system 900 may operate in the capacity of a receiving device, as described with reference to FIGS. 1-2. The computer system 900 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, a set-top box or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics-processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, or a solid-state display. Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924, so that a device connected to a network 926 can communicate voice, video or data over the network 926. Further, the instructions 924 may be transmitted or received over the network 926 via the network interface device 920.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other network transmission and for video (e.g., TCP/IP, UDP/IP, HTML, HTTP, VoIP, IPTV, MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
   determining, at a receiving device, a first connection speed of a data connection to a host;
   selecting a media content delivery method based on the first connection speed and user preference information, wherein the user preference information corresponds to selections of a delay value and a playback stoppage value, wherein the delay value corresponds to a delay before playback of the media content, and wherein the playback stoppage value corresponds to a likelihood of playback stoppages after playback of the media content begins;

requesting delivery of media content from the host using the media content delivery method;
determining, during delivery of the media content to the receiving device, a second connection speed of the data connection; and
determining, during delivery of the media content to the receiving device, whether to modify the media content delivery method based on the second connection speed and the user preference information.

2. The method of claim 1, wherein determining the second connection speed includes:
collecting a plurality of connection speed measurements during delivery of the media content;
computing an average connection speed based on the plurality of connection speed measurements; and
determining the second connection speed based on the average connection speed.

3. The method of claim 1, further comprising providing a user interface at the receiving device, wherein the user interface receives input relating to the user preference information, and wherein the user interface displays information related to the media content delivery method.

4. The method of claim 3, wherein the receiving device includes one of:
a computer;
a media player; and
a set-top box, wherein the set-top box provides the user interface via an output device coupled to the set-top box.

5. The method of claim 1, wherein the media content delivery method includes streaming, progressive downloading, and regular downloading.

6. The method of claim 1, further comprising determining a buffer fill size corresponding to an amount of the media content to be stored at the receiving device prior to initiating playback of the media content, wherein the buffer fill size is determined based on the media content delivery method and the user preference information.

7. The method of claim 1, wherein the media content delivery method is progressive downloading when a selection of the delay value corresponds to a preference of rapid playback start and a selection of the playback stoppage value corresponds to a preference of reduced playback stoppage.

8. The method of claim 6, further comprising determining, during receipt of the media content at the receiving device, whether to modify the buffer fill size based on the second connection speed and the user preference information.

9. The method of claim 1, further comprising:
receiving delivery of the media content using the media content delivery method, the media content delivery method comprising streaming the media content at a first bit rate associated with a high-definition format; and
in response to determining to modify the media content delivery method, receiving delivery of the media content using a second media content delivery method, the second media content delivery method comprising streaming the media content at a second bit rate associated with a non-high-definition format.

10. The method of claim 9, wherein the first bit rate is higher than the second bit rate.

11. The method of claim 10, wherein the first bit rate is associated with a high-definition media content format and wherein the second bit rate is associated with a non-high-definition media content format.

12. The method of claim 8, further comprising:
modifying the buffer fill size by a first value based on the second connection speed; and
modifying the buffer fill size by a second value based on the user preference information.

13. A computer-readable storage device storing instructions executable by a computer system to perform operations comprising:
determining, at a receiving device located at a particular location, a first connection speed of a data communication channel between the receiving device and a host;
selecting, based on the first connection speed and user preference information, streaming downloading or progressive downloading as a delivery method for media content, wherein the user preference information corresponds to selections of a delay value and a playback stoppage value, wherein the delay value corresponds to a delay before playback of the media content, and wherein the playback stoppage value corresponds to a likelihood of playback stoppages after playback of the media content begins;
determining, based on the first connection speed and the user preference information, a buffer fill size;
requesting delivery of the media content using the delivery method;
receiving delivery of the media content using the delivery method;
determining, during delivery of the media content to the receiving device located at the particular location, a second connection speed of the data communication channel between the receiving device and the host; and
selecting, during delivery of the media content, a second method of delivery based on the second connection speed and the user preference information.

14. The computer-readable storage device of claim 13, wherein the operations further comprise:
in response to selecting progressive downloading as the delivery method for the media content:
increasing the buffer fill size when the second connection speed is slower than the first connection speed; and
decreasing the buffer fill size when the second connection speed is faster than the first connection speed.

15. The computer-readable storage device of claim 13, wherein the operations include automatically executing a media playback command in response to determining that the second connection speed falls below a speed threshold, the media playback command including a first command to stop playback of the media content, a second command to restart playback of the media content, a third command to postpone playback of the media content until after a download of the media content is complete, or a combination thereof.

16. A system comprising:
a communications interface;
a memory; and
a processor coupled to the communications interface and to the memory, wherein the processor performs operations comprising;
receiving a selection of media content to be received from a host;
determining a first connection speed of a connection to the host;
selecting a first method of delivery for the media content based on the first connection speed and user preference information, wherein the user preference information corresponds to selections of a delay value and a playback stoppage value, wherein the delay value corresponds to a delay before playback of the media content, wherein the playback stoppage value corresponds to a likelihood of playback stoppages after playback of the media content begins, and wherein the first method of delivery includes:

streaming when the first connection speed satisfies a first speed threshold, wherein streaming includes:

streaming the media content at a first bit rate when the first connection speed satisfies a second speed threshold; and streaming the media content at a second bit rate when the first connection speed does not satisfy the second speed threshold; and progressive downloading when the first connection speed does not satisfy the first speed threshold;

receiving delivery of the media content using the first method of delivery;

determining, during delivery of the media content, a second connection speed of a connection; and selecting, during delivery of the media content, a second method of delivery based on the second connection speed and the user preference information.

17. The system of claim 16, wherein a buffer fill size is specified such that the media content is to reach the buffer fill size before the system commences playback of the media content.

18. The system of claim 17, wherein the buffer fill size is changed in response to changes in the connection speed.

19. The system of claim 16, wherein the first method of delivery comprises streaming the media content at a bit rate associated with a high definition format.

* * * * *